310-800
2/16/82    SR   XR   4,315,433

United States Patent [19]
Edelman et al.

[11] 4,315,433
[45] Feb. 16, 1982

[54] POLYMER FILM ACCELEROMETER

[75] Inventors: Seymour Edelman, Silver Spring; Beverly F. Payne, Gaithersburg, both of Md.

[73] Assignee: The United States of America as represented by the Secretary of the Army, Washington, D.C.

[21] Appl. No.: 131,575

[22] Filed: Mar. 19, 1980

[51] Int. Cl.³ .............................................. G01P 15/09
[52] U.S. Cl. .................. 73/517 R; 310/329; 310/800
[58] Field of Search ............... 73/517 R, 516 R; 310/329, 345, 358, 369, 800

[56] References Cited

U.S. PATENT DOCUMENTS

| 2,834,952 | 5/1958 | Harris | 73/516 R |
| 3,104,334 | 9/1963 | Bradley et al. | 310/329 |
| 3,792,204 | 2/1974 | Murayama | 310/800 |
| 3,893,342 | 7/1975 | Florian et al. | 73/517 R |
| 3,911,388 | 10/1975 | Crump et al. | 310/329 |
| 4,051,395 | 9/1977 | Taylor | 310/329 |

Primary Examiner—James J. Gill
Attorney, Agent, or Firm—William G. Gapcynski; Werten F. W. Bellamy

[57] ABSTRACT

An accelerometer is provided which utilizes at least one sheet of piezoelectric polymer film, supported under tension in a frame, for sensing the acceleration-responsive movements of an associated inertial mass and providing an electrical output in accordance therewith. The accelerometer preferably comprises a pair of such sheets with the inertial mass, e.g., a sphere, supported therebetween. Connections to an electrical measurement unit are made through a coaxial cable whose outer sheath and inner conductor are respectively connected to outer and inner electrodes formed by metallic coatings on the outer and inner surfaces of the sheets. The frame is preferably cylindrical and a pair of associated rings which fit within the frame serve to clamp the two sheets in place under tension.

9 Claims, 2 Drawing Figures

POLYMER FILM ACCELEROMETER

FIELD OF THE INVENTION

The present invention relates to accelerometers and, more particularly, to accelerometers of the type utilizing the piezoelectric effect in determining acceleration of a mass.

BACKGROUND OF THE INVENTION

Accelerometers are known wherein a material exhibiting the piezoelectric effect is used to determine acceleration, the deformation of the piezoelectric material due to the acceleration of an associated mass resulting in an electrical output which is measured and displayed. One example of such an accelerometer is disclosed in U.S. Pat. No. 3,893,342 (Florian et al). The accelerometer of the Florian et al patent includes a pair of beams located within a housing with a mass supported between the beams for axial movement. Each beam comprises a first layer of material having a relatively high tensile strength and second layer of a piezoelectric material, such as quartz, bond to the first layer. The piezoelectric layers are also coated with a conductor such as silver. The beams are prestressed when the accelerometer is assembled to place the first layer in tension and the second piezoelectric in compression so as to avoid tensile stress on the piezoelectric material. A further patent of interest is U.S. Pat. No. 4,104,921 (Nissl) which discloses a piezoelectric acceleration transducer including piezoelectric member having a planar surface in contact with a mass such that inertial forces on the mass are directed to be "effective perpendicularly" on the planar surface. As with all devices of this type, deformation of the piezoelectric member results in a corresponding electrical output signal which is measure of the inertial forces responsive to acceleration.

SUMMARY OF THE INVENTION

In accordance with the invention, an accelerometer is provided which is highly effective yet relatively simple to manufacture, and rugged and compact in construction.

An accelerometer constructed in accordance with the invention comprises a frame; at least one sheet of piezoelectric polymer film mounted in the frame under tension; an inertial mass coupled to the sheet of piezoelectric polymer film such that acceleration of the mass causes a change in the tension on said sheet of piezoelectric polymer film; at least one electrode comprising a metallic coating on said sheet; and measuring means, including an electrical conductor connected to the electrode, for measuring the change in electric charge on the electrode produced by a change in tension on the piezoelectric polymer film caused by acceleration of the mass. Preferably two such sheets of piezoelectric polymer film are supported by the frame, and the inertial mass is supported between sheets. Further, each of the sheets preferably includes inner and outer electrodes on opposite sides thereof, the sheets of piezoelectric polymer film being poled such that an increase in tension in one of the sheets causes the polarity of the electrical charges on the inner and outer electrodes of that sheet to be the same as the polarity of the charges on the inner and outer electrodes of the other sheet caused by a decrease in tension on that other sheet. The extend of the inertial mass along the axis of the frame is such that both of the sheets are stretched by an amount greater than any deformation of the sheets contemplated during the use of the accelerometer.

Advantageously, the electrical conductor which connects the electrodes of the two sheets to the measuring means comprises a coaxial cable having an inner conductor and outer sheath, the inner conductor of the coaxial cable being connected to the inner electrodes of the two sheets and the outer sheath of the coaxial cable being connected to the outer electrodes of the sheets. In a particularly compact and robust embodiment of the invention, the frame is cylindrical in shape and the inertial mass comprises a sphere. The frame includes an inwardly extending central flange portion, and a pair of rings fit inside of the inner walls of the frame on opposite sides of the flange portion, with the outer edges of said sheets being clamped between the rings and frame. The outer edges of the sheets are preferably cemented to the frame and the sphere constituting the inertial mass is optionally cemented to the two sheets.

Other features and advantages of the invention will be set forth in, or apparent from, the detailed description of the preferred embodiments which follows.

DESCRIPTION OF THE PREFERRED EMBODIMENTS

Figure 1:
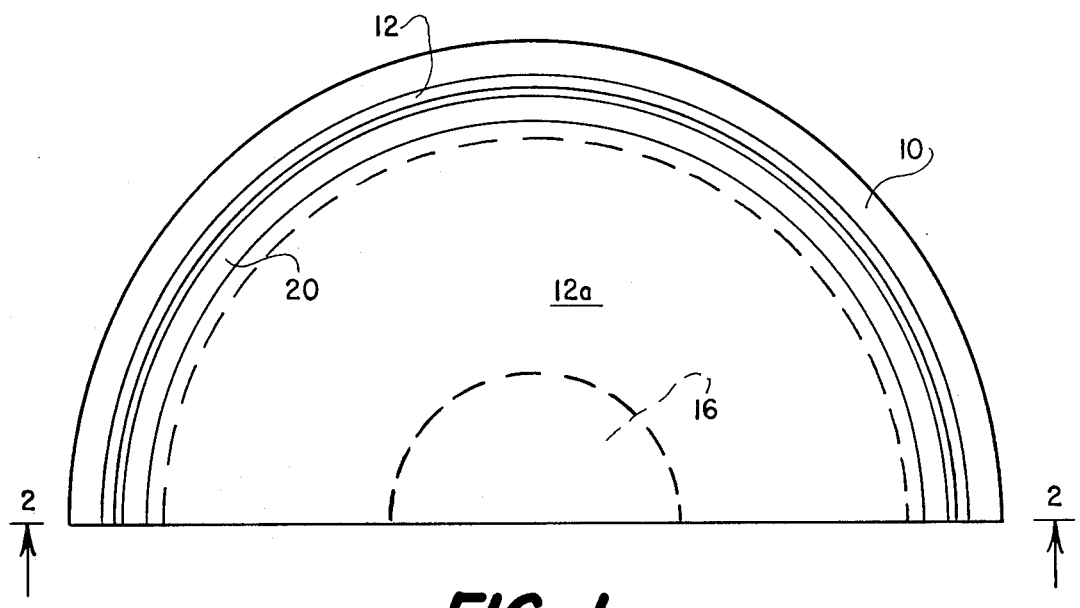
FIG. 1 is a plan view of a half-section of an accelerator constructed in accordance with a preferred embodiment of the invention.
Figure 2:
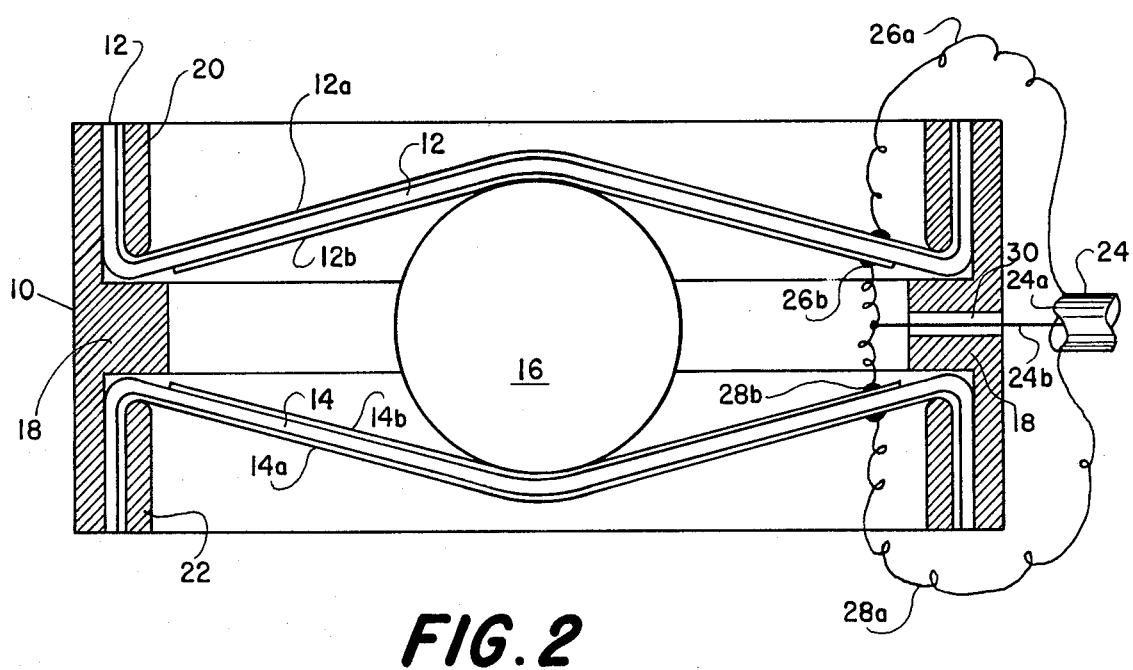
FIG. 2 is a transverse section generally taken along line 2—2 of FIG. 1.

Referring to FIGS. 1 and 2, a preferred embodiment of the accelerometer of the invention is shown which includes a frame 10, first and second sheets of piezoelectric polymer film, denoted 12 and 14 and held under tension with frame 10, and an inertial mass 16. In this preferred embodiment, the frame 10 comprises a relatively short cylinder fabricated of polymer, metal, ceramic or like and including a central inwardly directed flange 18.

The piezoelectric polymer sheets 12, 14 each comprises a film to each side of which is applied a metal electrode. Specifically, metal electrodes 12a and 12b are vapor deposited on opposite sides of film 12 and metal electrodes 14a and 14b are vapor deposited on opposite sides of film 14. The sheet 12 is cemented to the upper inner cylindrical surface of frame 10 while sheet 14 is cemented to the lower inner cylindrical surface. The cement used is preferably a rubber mucilage or a like weak adhesive which will permit the sheets 12, 14 to move in response to a shearing force.

A first cylindrical ring 20, having an outer diameter smaller than the inner diameter of the frame by an amount equal to slightly less than twice the thickness of the polymer sheet 12 is forced into the upper end of the frame 10 so that the polymer sheet 12 is stretched and clamped below the upper edge of the frame in the manner of a drumhead. The inertial mass 16, which preferably comprises a simple sphere is located between the two sheets 12 and 14 and a second ring 22 is used to stretch and clamp sheet 14 in the manner described above. Thus, sheets 12 and 14 are supported so as to tend to clamp mass 16 therebetween. Optionally, the mass 16 can be cemented to sheets 12, 14. The extent of mass 16 along the axis of the frame 10, i.e., along the vertical axis, is such that both sheets 12 and 14 are stretched a greater amount than would be caused by any deformation likely to occur during the use of the accelerometer. Thus, although the motion being measured will result in increasing or decreasing the tension in sheets 12, 14, it is important to note that because of construction provided each of the sheets is always under tension.

Electrical connections are made to electrodes 12a, 12b and 14a, 14b from a coaxial cable 24 comprising an outer sheath 24a and an inner conductor 24b. In particular, conductors 26a and 28a provide a connection between the outer electrodes 12a and 14a and the outer sheath 24a of cable 24 while conductors 26b and 28b provide a connection between inner electrodes 12b and 14b and the inner conductor 24b of cable 24. Conductors 26b, 28b extend through an opening 30 in flange 18 of frame 10. With this construction, the inner electrodes 12b, 14b are well protected while all exposed surfaces, including outer electrodes 12a, 14a and cable sheath 24a, can be at ground potential.

The polarity of sheets 12 and 14 is such that an increase in the tension on one sheet causes the polarity of the electrical charges on the inner and outer electrodes of that sheet to be the same as the polarity of the charges on the inner and outer electrodes caused by a decrease in tension in the other sheet. For example, if frame 10 is accelerated downwardly, the reaction of the inertial mass 16 in response to this downward acceleration will cause an increase in the tension in the upper sheet 12 and a decrease in the tension in the lower sheet 14, resulting in charges of the same sign on both inner electrodes 12b, 14b and charges of the opposite sign on both outer electrodes 12a, charges of the opposite sign on both outer electrodes 12a, 14a.

Although the invention has been described in relation to exemplary embodiments thereof, it will be understood by those skilled in the art that variations and modifications can be effected in these exemplary embodiments without departing from the scope and spirit of the invention.

We claim:

1. An accelerometer comprising a frame; a first sheet of piezoelectric polymer film having an inner surface and an outer surface and mounted in said frame under tension; a second sheet of piezoelectric polymer film having an inner surface and an outer surface and mounted in said frame under tension; an inertial mass disposed between said first and second sheets and in contact therewith such that acceleration of said mass causes a change in the tension on both of said sheets; at least one electrode comprising a metallic coating on said first sheet; a measuring means; and an electrical conductor connecting said electrode to said measuring means.

2. An accelerometer as claimed in claim 1 wherein each of said sheets includes inner and outer said electrodes on opposite sides thereof, said sheets of piezoelectric polymer film being poled such that an increase in tension on one of said sheets causes the polarity of the electrical charges on the inner and outer electrodes of said sheet to be the same as the polarity of the charges on the inner and outer electrodes of the other sheet caused by a decrease in tension on the other of said sheets.

3. An accelerometer as claimed in claim 2 wherein said outer electrodes comprise a metallic coating over the entirety of said outer surfaces to shield said inner electrodes.

4. An accelerometer as claimed in claim 2 wherein said electrical conductor comprises a coaxial cable have an inner conductor and outer sheath, the inner conductor of said coaxial cable being connected to the inner electrodes of said first and second sheets and the outer sheath of said coaxial cable being connected to the outer electrodes of said first and second sheets.

5. An accelerometer as claimed in claim 1 wherein said frame is cylindrical in shape and said inertial mass comprises a sphere.

6. An accelerometer as claimed in claim 5 wherein said frame includes an inwardly extending central flange portion, said accelerometer further comprising first and second rings which fit inside of the inner walls of the frame and are disposed on opposite sides of said flange portion, the outer edges of said sheets being clamped between said rings and said frame.

7. An accelerometer as claimed in claim 6 wherein said outer edges of said sheets are cemented to the frame.

8. An accelerometer as claimed in claim 6 wherein said frame is made of a polymer.

9. An accelerometer as claimed in claim 1 wherein the extent of the inertial mass along the axis of the frame is such that both of said sheets are stretched by an amount greater than any deformation which will result during use of the accelerometer.

* * * * *